UNITED STATES PATENT OFFICE.

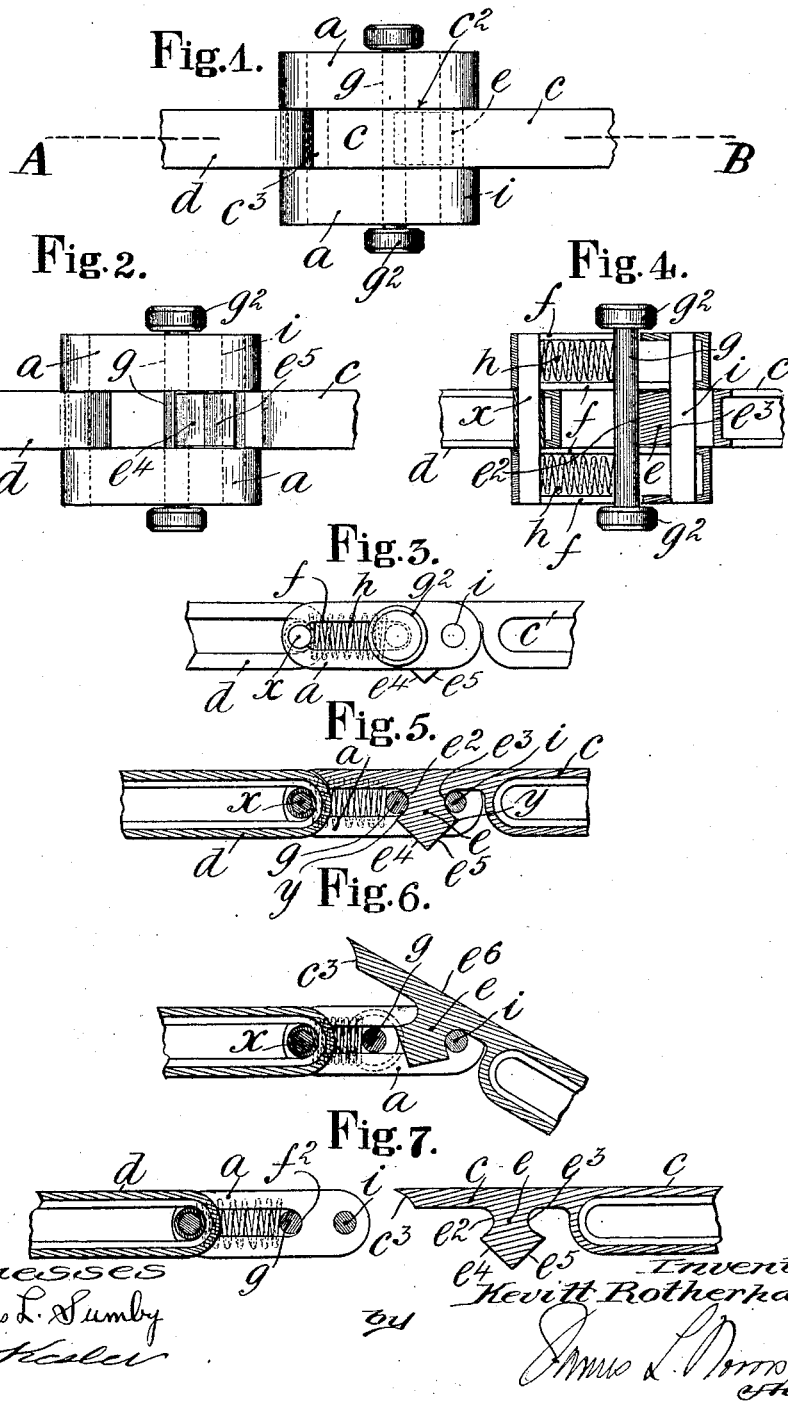

KEVITT ROTHERHAM, OF COVENTRY, ENGLAND.

FASTENER OR COUPLING.

1,114,530.

Specification of Letters Patent. Patented Oct. 20, 1914.

Application filed July 13, 1912. Serial No. 709,292.

*To all whom it may concern:*

Be it known that I, KEVITT ROTHERHAM, subject of the King of Great Britain, residing at 27 Spon street, Coventry, in the county of Warwick, England, have invented a certain new and useful Improved Fastener or Coupler; and I do hereby declare that the following is a full, clear, and exact description of the same.

The invention provides an improved fastener or coupler particularly applicable to the ends of bracelets, necklets, and similar bands and lengths, and consisting of a combination of parts operating most efficiently in securing the two loose ends to each other in an easily detachable manner, extremely neat in design, and very simple for finger operation.

The accompanying drawings illustrate the invention in its most desirable form applied for coupling up two end links of a metal bracelet or like band, but it will be obvious that the combination of parts may be readily applied for detachably securing the two loose ends of any band or length, or for securing two lengths.

Figure 1 is an external plan of the fastener applied to the two end links, which are shown connected up. Fig. 2 is an underside plan of Fig. 1. Fig. 3 is a side elevation of Fig. 1. Fig. 4 is a sectional plan of Fig. 1 partly in elevation. Fig. 5 is a section of Fig. 1 on the dotted lines A B. Fig. 6 is a section similar to Fig. 5 but showing how the two end links are detached. Fig. 7 is a section similar to Figs. 5 and 6 but with the end links detached and separated.

The one link to be connected up is represented by the longitudinal hollow bars, $a$, $a$, which are oppositely arranged a distance apart and carry the movable parts of the fastener means. The other link to be connected up is represented at $c$ and is formed to nicely fit the parallel space $c^2$ between the bars $a$, $a$, up to the intermediate link, $d$, against which the end $c^3$ of the link $c$ abuts longitudinally of the bracelet parts. The pair of bars $a$, $a$ form the outer link and the link $c$ is the inner link and this latter has formed integral with it at $e$ a lug or projection which depends from its under or inner side and is of the same thickness as said link $c$ and adapted to fit the space $c^2$ between the pair of bars $a$. This lug or projection is provided at $e^2$, $e^3$ with undercut seatings, and at $e^4$, $e^5$ with inclined faces oppositely arranged in the center of the lug to lead into the seatings, said lug therefore having a head formation. When the links $a$, $a$ and $c$ are coupled the back, or outer face, $e^6$ of the link $c$ is flush with the outer faces of the bars $a$, $a$.

The hollow bars $a$, $a$ are each oppositely side-slotted at $f$, $f$, to accommodate a transverse bar $g$ which passes through the whole of the slots and forms a hand operated slidable locking bar, or bolt, operating by the action of springs $h$, $h$ inclosed one within each of the bars $a$, $a$ to engage the undercut seating $e^2$ of the lug $e$. The slots $f$ guide the movement of the locking bar, $g$, which is withdrawn from engagement with the seating $e^2$ by a pull on the enlarged ends $g^2$, $g^2$ of said bar, which ends are external of the bars $a$, $a$. The springs $h$ fit in the chambers provided by the interiors of the bars $a$, $a$ and are in compression between the locking bar $g$ and the transverse pivot pin $x$ by which the link $d$ is connected up to the bars $a$, $a$. The other undercut seating $e^3$ of the lug $e$ engages a second transverse bar, $i$, suitably fixed at its ends within the hollow bars, $a$, $a$, to position them and distance them apart, this second bar being therefore a rigid one carried by the outer link or piece to be connected up. The manner in which the two bars $g$ and $i$ hold the lug $e$ within the space $c^2$ is clearly represented in Fig. 5, and the manner of release by a sliding movement of the bar $g$ in Fig. 6, and from Fig. 5 it will be clear that longitudinally of the links the link $c$ is held by the bar $i$ and by the abutting end $c^3$ against the link $d$, and that in a direction of disconnection the lug $e$ is held by both bars $g$ and $i$, so that there is a double locking of the lug by the bars against disconnection by the provision of the two undercut seatings $e^2$ and $e^3$.

The inclined faces $e^4$, $e^5$ provide a sort of snap action of the lug into engagement with the bars $g$ and $i$, while the undercut seatings $e^2$, $e^3$ are so provided in relation to said faces that portions $y$, $y$ of the lug project well underneath the center of each of the bars $g$ and $i$ to thereby prevent any disconnection of the two links without slidably drawing back the bar $g$, said portions $y$, $y$ being formed in any suitable manner to provide this securely locking feature. The bar $g$ is stopped in its traverse toward the bar $i$ by the ends $f^2$ of the slots $f$.

The combination of parts hereinbefore described in their formation and operation are subject to some modifications all contained within the scope of the claims.

Having now described my invention what I claim and desire to secure by Letters Patent is:—

1. In a fastener, the combination of a member provided with a rigid lug having opposite, under-cut seatings; and a second member provided with a space for the reception of said lug and with a fixed bolt and a spring-controlled movable bolt extending across said space for engagement in said seatings, said members having portions thereof abutting against each other to prevent endwise movement of said members toward each other when said bolts are thus engaged.

2. In a fastener, the combination of a member provided with a rigid, longitudinal projection formed with a lug having opposite, under-cut seatings and oppositely-inclined faces leading into said seatings; and a second member provided with a space for the reception of said projection and its lug, and with a fixed bolt and a spring-controlled movable bolt extending across said space for engagement with said seatings, said projection abutting at its free end against the inner end wall of said space, to prevent endwise movement of said members toward each other when said bolts are thus engaged.

3. In a fastener, the combination of a member provided with a rigid lug having opposite, under-cut seatings and oppositely-inclined faces leading thereinto; a second member provided with a space for the reception of said lug and with chambers at opposite sides of such space; fixed and movable bolts mounted on the second member and extending across said space and into said chambers for engagement in said seatings; and springs arranged in said chambers and bearing against the movable bolt to hold the same in such engagement, said members having portions thereof abutting against each other to prevent endwise movement of said members toward each other when said bolts are thus engaged.

4. In a fastener, the combination, with a pair of hollow bars arranged in spaced, parallel relation, and a member to which said bars are connected at one end thereof; of a second member provided with a head having opposite under-cut seatings, said head being adapted for reception in the space between said bars; fixed and movable bolts connecting said bars and extending across said space for engagement in said seatings; springs arranged in said bars and bearing against said movable bolt to hold the same in such engagement; and coöperating means provided upon said members for holding them against relative endwise movement in one direction when said bolts are thus engaged.

5. In a fastener, the combination, with a pair of hollow bars arranged in spaced, parallel relation, and a member to which said bars are connected at one end thereof; of a second member provided with a rigid, longitudinal projection having a head formed on its inner face, and provided with opposite, under-cut seatings, said projection and its head being adapted for reception in the space between said bars; fixed and movable bolts connecting said bars and extending across said space for engagement in said seatings; and springs arranged in said bars and bearing against said movable bolt to hold the same in such engagement, said projection having its free end abutting against the adjacent end of the first-named member to prevent relative movement of said members when said bolts are thus engaged.

Signed at Birmingham, in the county of Warwick, England, this 1st day of July, 1912.

KEVITT ROTHERHAM.

Witnesses:
 GEO. FUERY,
 BERNARD H. TINGLE.

---

Copies of this patent may be obtained for five cents each, by addressing the "Commissioner of Patents, Washington, D. C."